(12) United States Patent
Phacharintanakul et al.

(10) Patent No.: US 12,493,886 B2
(45) Date of Patent: Dec. 9, 2025

(54) METHOD AND SYSTEM FOR VERIFYING TRANSACTIONS

(71) Applicant: International Business Machines Corporation, Armonk, NY (US)

(72) Inventors: Kaweepoj Phacharintanakul, Warwick (GB); Wolfgang von Drews, Crailsheim (DE)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 18/485,016

(22) Filed: Oct. 11, 2023

(65) Prior Publication Data
US 2025/0094990 A1 Mar. 20, 2025

(30) Foreign Application Priority Data
Sep. 20, 2023 (GB) ...................................... 2314420

(51) Int. Cl.
*G06Q 20/00* (2012.01)
*G06Q 20/40* (2012.01)
(52) U.S. Cl.
CPC ..... *G06Q 20/4016* (2013.01); *G06Q 20/4014* (2013.01)
(58) Field of Classification Search
CPC ........... G06Q 20/4016; G06Q 20/4014; G06Q 20/389; G06Q 50/01; G06Q 20/384; G06N 3/09; G06N 20/10
USPC ................. 705/16, 21, 59; 380/44, 262, 278
See application file for complete search history.

(56) References Cited

U.S. PATENT DOCUMENTS

| | | | |
|---|---|---|---|
| 9,418,365 B2 | 8/2016 | Groarke et al. | |
| 9,818,117 B2 | 11/2017 | Groarke et al. | |
| 11,113,692 B1 | 9/2021 | Ran et al. | |
| 11,494,770 B1 | 11/2022 | Gross et al. | |
| 2015/0193774 A1 | 7/2015 | Wetzel | |
| 2020/0034838 A1 | 1/2020 | Acuna-Rohter | |
| 2020/0374311 A1 | 11/2020 | Madhu et al. | |

(Continued)

FOREIGN PATENT DOCUMENTS

| | | |
|---|---|---|
| CN | 108765179 A | 11/2018 |
| GB | 2633784 A | 3/2025 |

OTHER PUBLICATIONS

Bouchti et al., "Fraud Detection in Banking Using Deep Reinforcement Learning," https://doi.org/10.1109/INTECH.2017.8102446, The Seventh International Conference on Innovative Computing Technology (INTECH 2017), pp. 58-63.

(Continued)

*Primary Examiner* — Dante Ravetti
(74) *Attorney, Agent, or Firm* — Scott Dobson

(57) ABSTRACT

A method, computer program product, and computer system are provided for verifying transactions. The method includes analyzing past transactions and categorizing the transactions into multiple categories; analyzing a social network of a transaction owner to identify a set of closest social network contacts for the transaction owner for each transaction category; and proposing the set of closest social network contacts as candidate transaction verifier contacts to be used by a transaction verifying entity for incoming transactions of the transaction category by the transaction owner to the transaction verifying entity.

20 Claims, 9 Drawing Sheets

(56) References Cited

U.S. PATENT DOCUMENTS

2022/0351209 A1   11/2022  Kishore et al.
2023/0156424 A1*  5/2023  Lee ..................... G01S 13/765
                                                                455/456.1

OTHER PUBLICATIONS

Chau et al., "Fraud Detection Using Social Network Analysis, A Case Study," https://link.springer.com/referenceworkentry/10.1007/978-1-4614-7163-9_284-1, Encyclopedia of Social Network Analysis and Mining [Online]. New York, NY: Springer, pp. 1-6.
Goyal et al., "Fraud Detection on Social Media using Data Analytics," https://www.ijert.org/research/fraud-detection-on-social-media-using-data-analytics-IJERTV9IS010204.pdf, International Journal of Engineering Research and Technology, ISSN; 2278-0181, vol. 9, Issue 01, Jan. 2020, 6 pgs.
ÓSkarsdottir et al., "Social network analytics for supervised fraud detection in insurance," https://deepai.org/publication/social-network-analytics-for-supervised-fraud-detection-in-insurance, arXiv:2009.08313v1 [cs.SI] Sep. 15, 2020, 37 pgs.
Phacharintanakul et al., "Method and Process of Using Social Network to Verify Financial Transaction," Application No. 2314420.7, filed Sep. 20, 2023.
Vimal et al., "Application of Deep Reinforcement Learning to Payment Fraud," https://doi.org/10.48550/ arXiv.2112.04236, arXiv:2112.04236v1 [cs.LG] Dec. 8, 2021, 8 pgs.
Yedidia et al., "Understanding Belief Propagation and Its Generalizations," Mitsubishi Electric Research Laboratories, Inc., https://www.merl.com/publications/docs/TR2001-22.pdf, TR2001-22, Nov. 2001, 36 pgs.
Intellectual Property Office, Patents Act 1977: Search Report under Section 17(5), Mar. 18, 2024, 8 Pages, GB Application No. 2314420.7.

* cited by examiner

METHOD AND SYSTEM FOR VERIFYING TRANSACTIONS

BACKGROUND

The present disclosure relates to verifying transactions, and more specifically, to verifying transactions using social networks.

Electronic transactions in the transaction networks such as banking networks contain structured (e.g., Single Euro Payments Area (SEPA) category purpose code: Credit (e.g., wage credit)/Debit (e.g., eCommerce initiated)), timestamp, merchant/location, or free-text information (reference/ID attributes) which may be used to categorize or classify transactions into specific areas e.g., for categorizing household spending behavior.

Current fraud detection systems work with current and historic transaction information to determine fraud by means of calculating a Transaction Trust Score. If a transaction is determined as a 'true' positive fraud indication by having a trust score lower than a threshold and falling into 'red zone', the transaction is blocked. If a transaction has a trust score that is higher than another threshold, it falls into a 'green zone' and is approved as being not fraudulent. However, there is an area of determination in which transactions cannot be binarily decided as being fraudulent or not and need some intervention by the transaction verifying entity (e.g., a bank). This is herein referred to as the 'grey zone'. Transactions in the grey zone, which normally includes false positives, traditionally require manual intervention.

Transactions in the grey zone traditionally require intervention by the transaction verifying authority to determine if they are fraudulent or not.

SUMMARY

According to an aspect of the present disclosure there is provided a computer-implemented method for verifying transactions, the method including: analyzing past transactions and categorizing the transactions into multiple categories; analyzing a social network of a transaction owner to identify a set of closest social network contacts for the transaction owner for each transaction category; and proposing the set of closest social network contacts as candidate transaction verifier contacts to be used by a transaction verifying entity for incoming transactions of the transaction category by the transaction owner to the transaction verifying entity.

According to another aspect of the present disclosure there is provided a system for verifying transactions, the system including: one or more processors and one or more memories configured to provide computer program instructions to the one or more processors to execute the functions of the components of a transaction verifying preparation system including: a transaction analyzing component for analyzing past transactions and a transaction classifying component for categorizing the transactions into multiple categories; a social network analyzing component for analyzing a social network of a transaction owner to identify a set of closest social network contacts for the transaction owner for each transaction category; and a verifier candidate obtaining component for proposing the set of closest social network contacts as candidate transaction verifier contacts to be used by a transaction verifying entity for incoming transactions of the transaction category by the transaction owner to the transaction verifying entity.

According to a further aspect of the present disclosure there is provided computer program product for verifying transactions, the computer program product comprising one or more computer readable storage media having program instructions embodied therewith, the program instructions executable by one or more processors to cause the one or more processors to perform operations comprising: analyzing past transactions and categorizing the transactions into multiple categories; analyzing a social network of a transaction owner to identify a set of closest social network contacts for the transaction owner for each transaction category; and proposing the set of closest social network contacts as candidate transaction verifier contacts to be used by a transaction verifying entity for incoming transactions of the transaction category by the transaction owner to the transaction verifying entity.

BRIEF DESCRIPTION OF THE DRAWINGS

Embodiments of the present disclosure will now be described, by way of example only, with reference to the accompanying drawings.

Figure 1A:
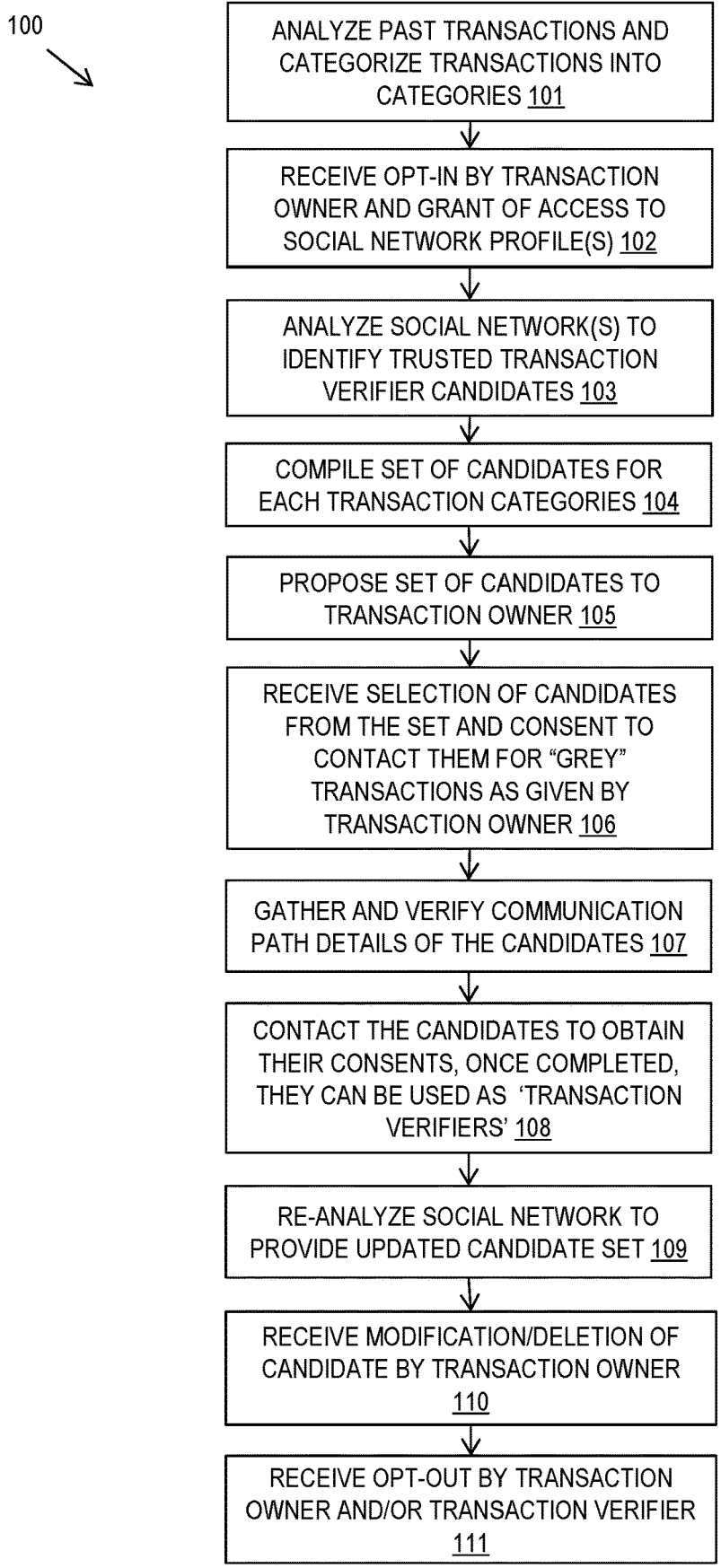
FIGS. 1A and 1B are flow diagrams of example embodiments of a preparation phase of a method in accordance with embodiments of the present disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of a method, system, and computer program product are provided for determining candidate contacts of a transaction owner as transaction verifiers and verifying transactions by a transaction verifying entity at the time of an incoming transaction by a transaction owner. The transaction owner may be the person or group carrying out a transaction. A transaction may be a financial transaction, login transaction, security transaction, identification transaction, etc. The transaction verifying entity may be an entity that verifies a transaction as not being fraudulent. This may be an entity that authorizes transactions or a separate entity that verifies transactions on behalf of the authorizing entity.

The method includes a preparation phase that may be carried out by or on behalf of a transaction verifying entity including analyzing past transactions and categorizing the transactions into multiple categories. The preparation phase includes analyzing a social network of a transaction owner to identify a set of closest social network contacts for the transaction owner for each transaction category. The preparation phase proposes the set of closest social network contacts as candidate transaction verifier contacts to be used by a transaction verifying entity for incoming transactions of the transaction category by the transaction owner. The preparation phase may be updated with feedback from ongoing transactions and through supervised learning.

The method includes a transaction phase at the time of an incoming transaction to a transaction verifying entity. This phase may be carried out if an incoming transaction is determined to be potentially fraudulent by an existing fraud detection system, for example, if it is in a "grey zone". The method at the transaction phase includes analyzing an incoming transaction of a transaction owner to determine a transaction category for the incoming transaction and determining the set of closest social network contacts of the transaction owner for the transaction category.

The described method and system use social network analysis to obtain information on the proximity of transaction owners with their social networks. The proximity may be based on an affinity analysis of profile metadata and/or connection attributes compared to transaction attributes.

The described method and system reduce false positives and reduce the number of transactions requiring traditional intervention. The transactions may take various forms including: financial transactions, credential verification transactions, identity verification transactions, security transactions, etc. The transaction verifying entity may be a financial entity, a security entity, etc. The method and system of transaction verification is an improvement in the technical field of security.

The described method uses social network analysis to determine a best matching contact from a person's social network to provide input on a transaction that has been flagged as doubtful.

Referring to FIG. 1A, a flow diagram 100 shows an example embodiment of the preparation phase of the verification method.

The method may analyze 101 past transactions and categorize the transactions into multiple categories. This analysis may be updated and may be personalized to a transaction owner, when more information of a specific transaction owner or transaction owner segments is available.

The method may receive 102 an opt-in to the processing by a transaction owner who may grant access to their social network profile. This may include access to more than one source of social media networks. The method analyzes 103 the social network of a transaction owner to identify and compile 104 a set of closest social network contacts for the transaction owner for each transaction category.

The method may propose 105 the set of closest social network contacts as candidate transaction verifier contacts to be used by a transaction verifying entity for incoming 'grey' transactions of the transaction category by the transaction owner to the transaction verifying entity. The method may receive 106 selection and consent to contact the selected candidates as given by the transaction owner. The method may gather and verify 107 communication path details for the candidates selected and consented by the transaction owner. The method may obtain 108 consents from each candidate. Once completed, the candidates whose communication paths have been verified and whose positive consents have been obtained can later be used as 'transaction verifiers'.

The method may re-analyze 109 the social network of a transaction owner to provide an updated candidate set. The re-analysis may also take into account the feedback of the selection process by the transaction owner and by the transaction verifier. This re-analysis may also take place after transaction execution phase.

The method may receive 110 and action modifications or deletions of candidates by the transaction owner. The method may also receive 111 and action an opt-out of the verification method by the transaction owner and/or the transaction verifiers.

In the preparation phase, which is independent of a specific transaction, social network analysis is being applied to a transaction owner's social network where the transaction owner has opted in to use the verification service in order to identify and propose candidates for specific transaction categories. Once the identified candidates are confirmed and have consented to being used as trusted persons, they can be potentially contacted to ask for their input during the transaction execution phase in case of doubtful transactions. The response of the trusted person may be taken as additional input for further transaction processing within the transaction verifying entity, i.e. whether to treat a transaction as fraudulent or not.

Current implementations of fraud detection systems rely on attributes of the current transaction as well as on analysis of transaction history either from the user or patterns derived from all previous transactions based on information coming from the transaction verifying entity user's transaction space. The inclusion of knowledge derived from social network analysis with the purpose of identifying one or more verifying candidates provides a means for improving the transaction processing.

Current solutions aim to maximize fraud recall rates and the described method introduces a mechanism to facilitate an intervention in such cases, with the aim to reduce false positives and thereby reduce the number of transactions requiring traditional intervention. This results in a reduced cost to a transaction verifying entity and improves customer satisfaction. Adding information from the transaction owner's social network provides additional data points for scoring transactions, which can be used in this setting.

The disclosed method includes a machine-learning based method employed during the preparation phase. This may be a supervised learning method. The machine-learning may use a vector space with vectors representing data points with multiple features.

Figure 1B:
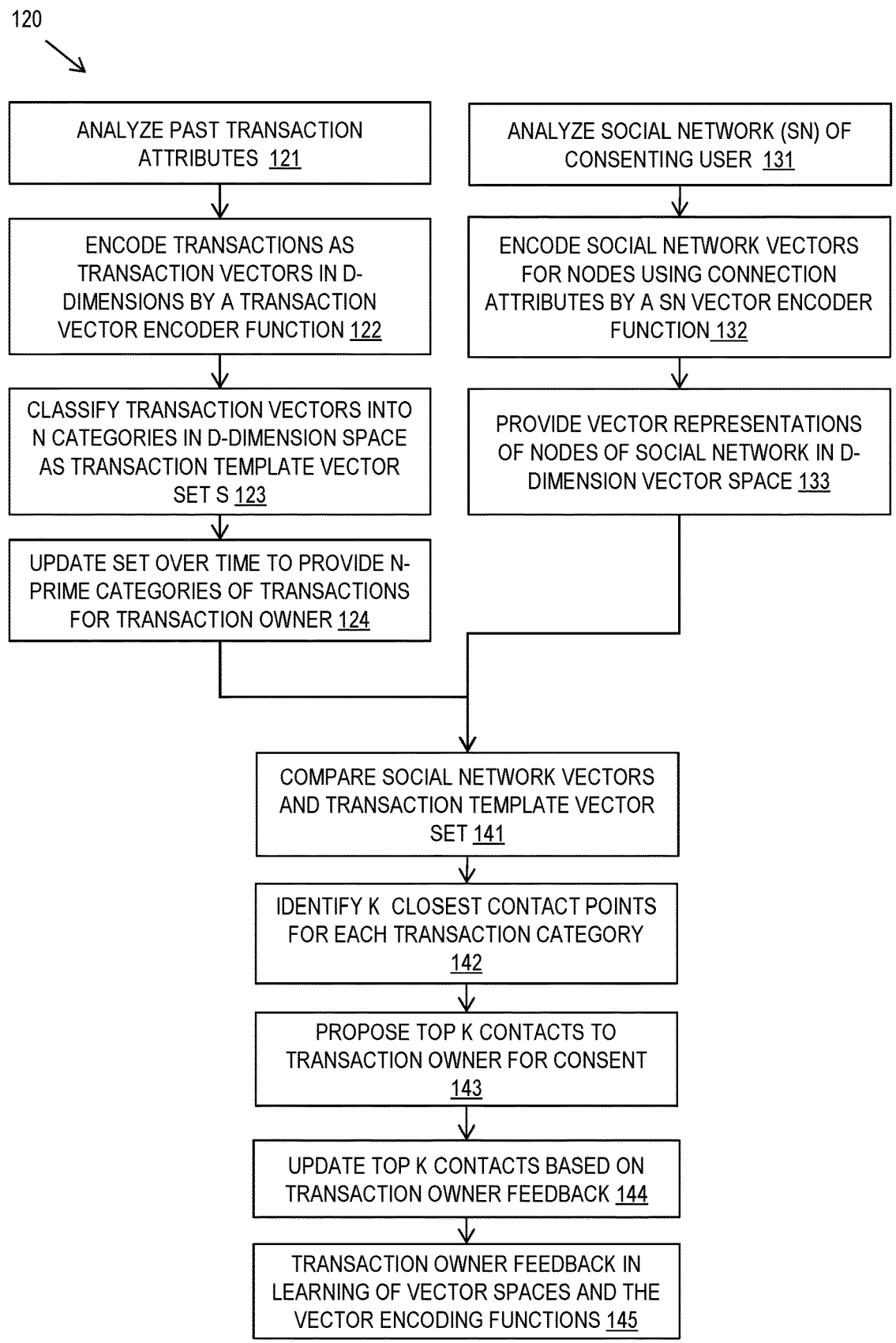

Referring to FIG. 1B, a flow diagram 120 shows an example embodiment of the preparation phase of the verification method using vector spaces for machine-learning.

The method analyzes 121 past transactions and encodes 122 past transactions having transaction attributes as transaction vectors in a multiple dimension space in D-dimensions. The method classifies 123 the transaction vectors into multiple N categories to produce a set of transaction template vectors S. The set of transaction template vectors may be for all transaction owners, a segment of transaction owners such as a specific group of transaction owners, or a specific transaction owner. A segment may be introduced to enable finer-grained transaction template vectors instead of being based on the whole population. This provides a position between a personalized template vector and the whole population-based template vector. Segments may be based on age group, disposable income, professions, gender, credit ratings, life style, etc.

The method may update 124 the set of transaction template vectors S over time to provide N-prime categories of transactions for a transaction owner based on their personalized transaction set of template vectors S-prime.

The method analyzes 131 a social network (SN) of a consenting transaction owner, where the SN may be represented in a graph database comprising of nodes and edges, where each node represents a contact and the corresponding edge between two nodes represent attributes of the connection between them. The method may encode 132 social network vectors for nodes of the social network using connection attributes. The method may provide 133 vector representations of nodes in the same common D-dimension vector space.

The method compares 141 the social network vectors to the transaction template vectors to identify a closest set of social network contacts for a transaction category. The comparing may use vector similarity, for example, a cosine similarity method.

The method may identify 142 K closest social network contacts as candidate transaction verifiers for each transaction category and may propose 143 the top K contacts to the transaction owner for consent. The top K contacts may be updated 144 based on the transaction owner feedback. The transaction owner feedback may be used in further learning 145 of the vector spaces and the vector encoding functions.

The method is a supervised learning scheme, where data is sourced from transactions of various types from different transaction authorizers across different geographies with different details which are grouped into N categories, and the corresponding social networks of transaction owners carrying out the transactions being curated with the best candidates determined to verify when the transactions are in-doubt.

The algorithmic aim is that the transactions can be represented by vectors within a D-dimension space. Transactions are represented by vectors within the D-dimension space by an "Transaction2Vect" encoder function. Once all transactions vectors are known, they are classified into N groups. Likewise, social network (SN) nodes (along with attributes) are represented by vectors within the same space using a "SN2Vect" encoder function.

The common D-dimension vector space is learned and represents common latent information between transaction attributes and social network attributes. For example, a financial transaction may include attributes such as a merchant, a time, an amount, etc. and a social network may include attributes relating to a reason for connection, a longevity of connection, etc.

The supervised learning aim is to train both encoder functions (Transaction2Vect and SN2Vect) automatically given data containing relations between transactions and SN data, with N and D as hyper-parameters. The algorithmic objective function is to minimize error of associations between transactions and social network nodes in the training data when they are associated via maximum cosine similarity scores in the common vector space.

Figure 2A:
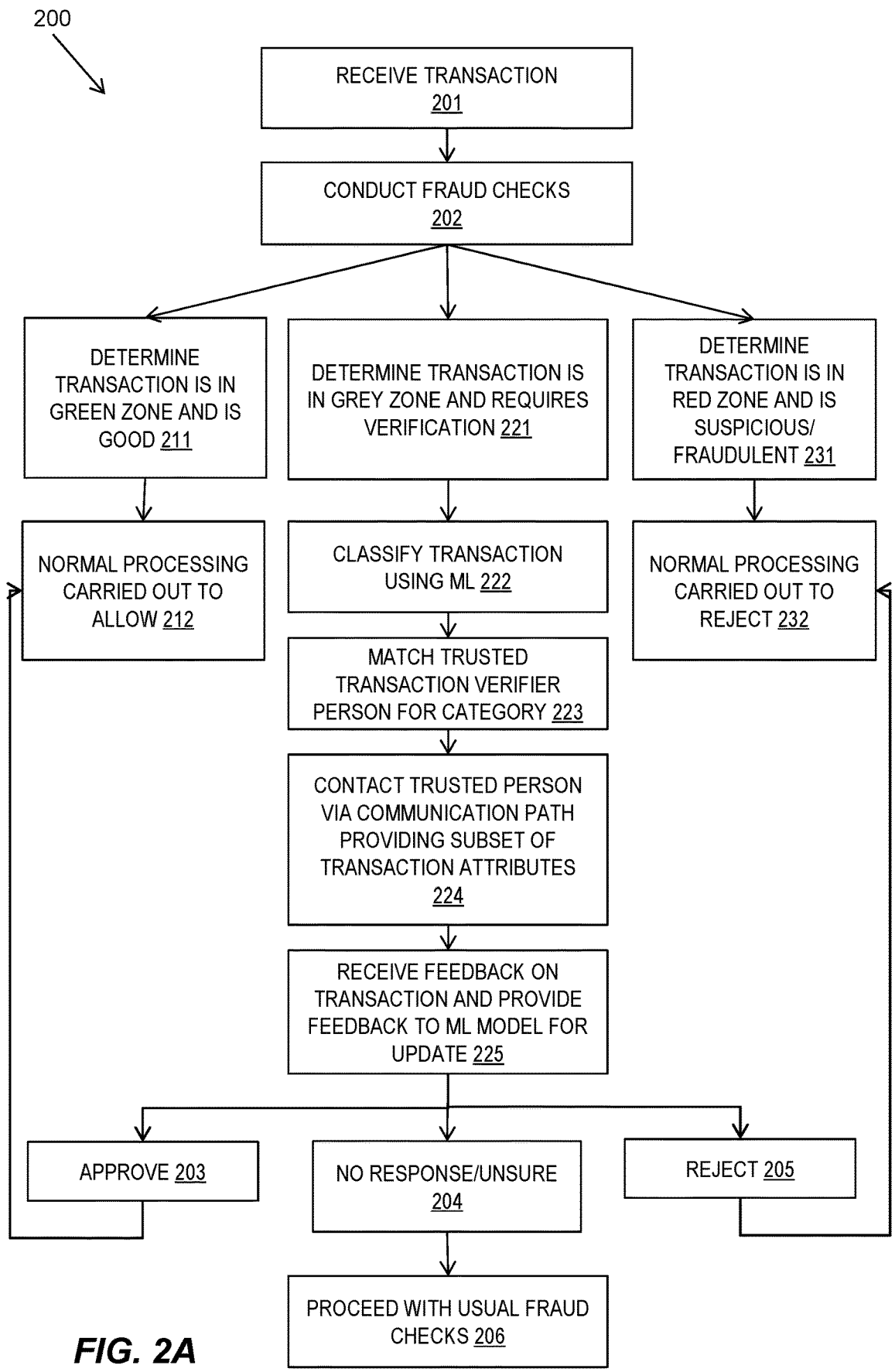
FIGS. 2A, 2B and 2C are flow diagrams of example embodiments of a transaction execution phase of a method in accordance with embodiments of the present disclosure.

Referring to FIG. 2A, a flow diagram 200 shows an example embodiment of a transaction execution phase for transaction verification carried out by a transaction verifying entity as an enhancement for existing transaction verification systems.

The method may receive 201 at the transaction verifying entity a current transaction of a transaction owner and may conduct 202 fraud checks. The fraud checks may determine 211 that the transaction is in the green zone and is therefore good. In this case, normal processing may be carried out 212 to allow the transaction. As another option, the fraud checks may determine 231 that the transaction is in the red zone and is therefore suspicious or fraudulent. In such a case, normal processing may be carried out to reject the transaction.

Another option is that the fraud checks determine 221 that the transaction is in a grey zone and requires further verification.

The method may analyze the incoming transaction that is determined to be potentially fraudulent. This includes classifying 222 the transaction in a transaction category. This may use a machine-learning classification, an embodiment of which is described further below. The method may determine the set of closest social network contacts of the transaction owner for the transaction category and may match 223 a transaction verifier person for the category.

The method may contact 224 the trusted person via an established communication path and may provide a subset of the current transaction attributes to the trusted person. The method may receive 225 feedback on the transaction and the feedback may be provided to update the machine learning model of transactions.

The response may be approval 203 of the transaction, in which case, the method may proceed to normal processing 212 to allow the transaction. The response may be rejection 205 of the transaction, in which case, the method may proceed to normal processing 232 to reject the transaction. The response may otherwise be either no response or an unsure response 204 from the trusted person. In this case, normal additional fraud processing checks 206 may be carried out for the transaction.

Figure 2B:
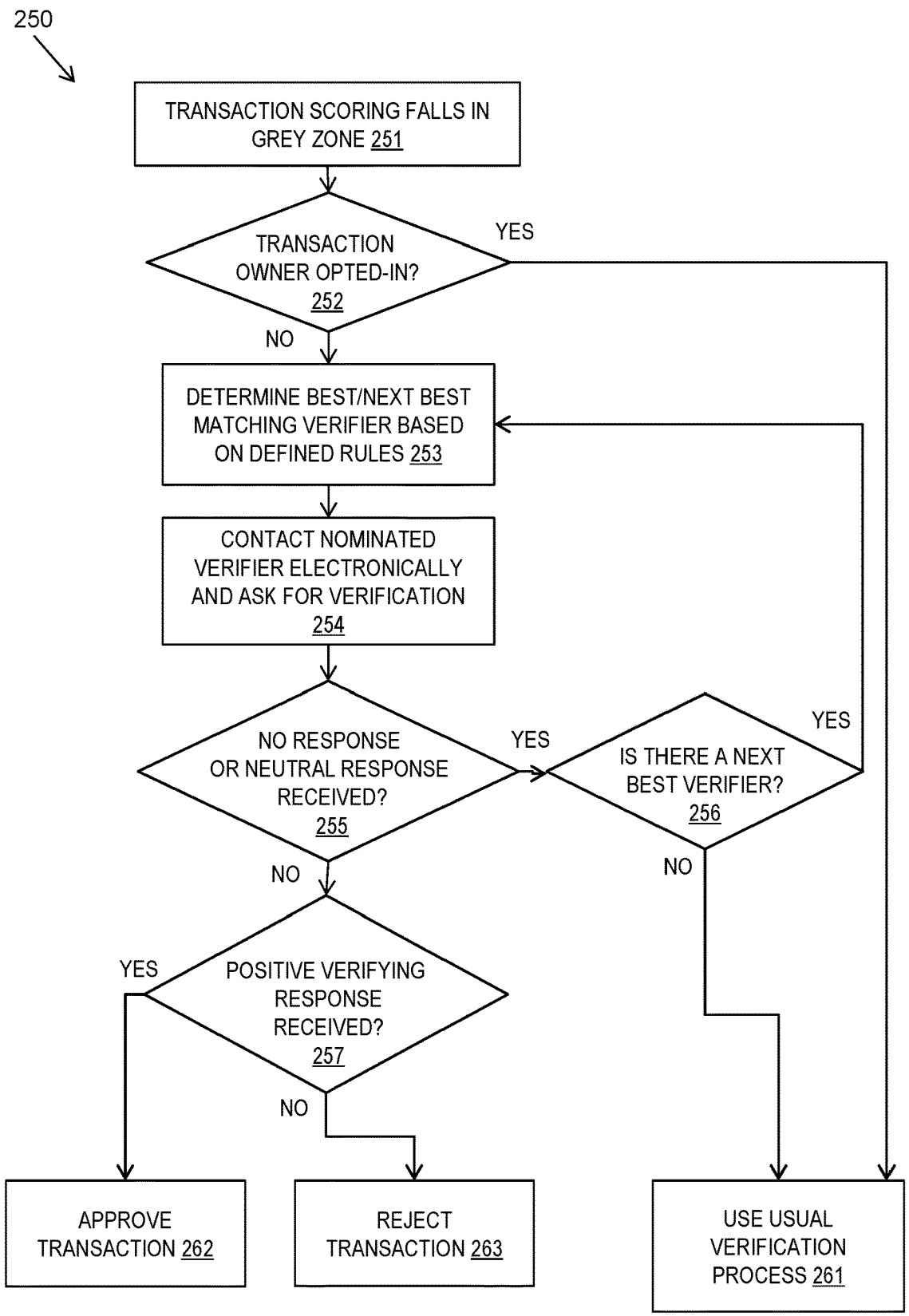

Referring to FIG. 2B, a flow diagram 250 shows a further example embodiment of a transaction execution phase for transaction verification carried out by a transaction verifying entity.

The method determines 251 that a transaction scoring of an incoming transaction falls in a grey zone and requires further verification. It is determined 252 if the transaction owner is opted-in to the described transaction verification method. If the transaction owner is not opted-in, then the transaction is passes to a usual verification process 261. If the transaction owner is opted-in, the method determines 253 the best matching social network contact verifier based on defined rules as described in relating to FIG. 2A. The method contacts 254 the nominated verifier and asks for verification of the incoming transaction.

It is determined 255 if there is no response from the verifier or a neutral response that declines to give assurance on the transaction. If this is the case, then it is determined 256 if there is a next best verifier available. If there is no next best verifier, then the transaction is passed to a usual verification process 261. If there is a next best verifier, the method loops to determine 253 the next best verifier and repeats the process.

If there is a definitive verifying response, it is determined 257 if the response is positive approving the transaction or negative rejecting the transaction. If it is positive, the transaction is approved 262 or, if it is negative, the transaction is rejected 263.

Figure 2C:
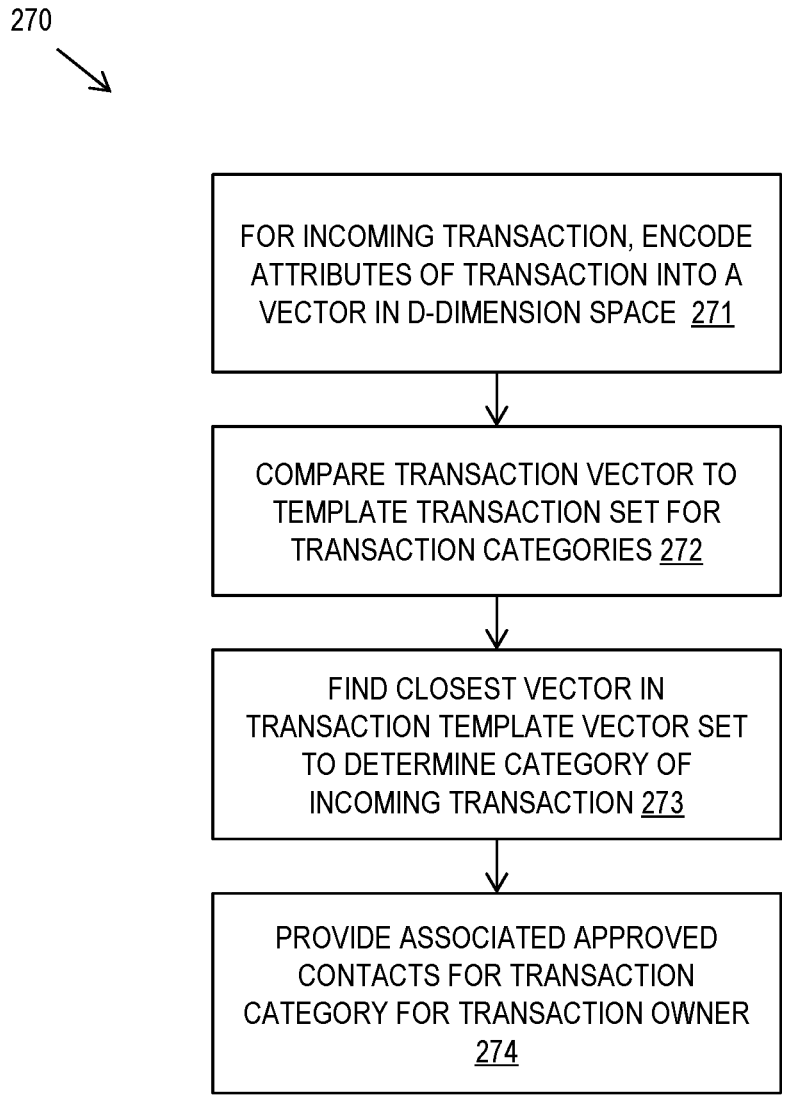

Referring to FIG. 2C a flow diagram 270 shows an example embodiment of the transaction execution phase of the verification method using vector spaces for machine-learning. Following on from the example embodiment of FIG. 1B using vector spaces for machine-learning, the following method may be carried out for an incoming transaction.

For an incoming transaction, the method may encode 271 the transaction attributes into the vector D-dimension space to obtain a transaction vector.

The method may compare 272 the transaction vector of the incoming transaction to the set of transaction template vectors to determine a transaction category for the incoming transaction. The set of transaction template vectors S may be for the specific transaction owner or may be a general set of template vectors for a group of transaction owners or all transaction owners.

The method may find 273 a closest vector in the transaction template vector set S and determine the category of the incoming transaction. The method may provide 274 the set of closest approved social network contacts of the transaction owner for the transaction category for verifying the incoming transaction.

Preparation Phase

During the preparation phase, each transaction owner's social network, for transaction owners who have opted into the service, is analyzed to identify the best candidates to be contacted for different categories of the transactions.

Figure 3A:
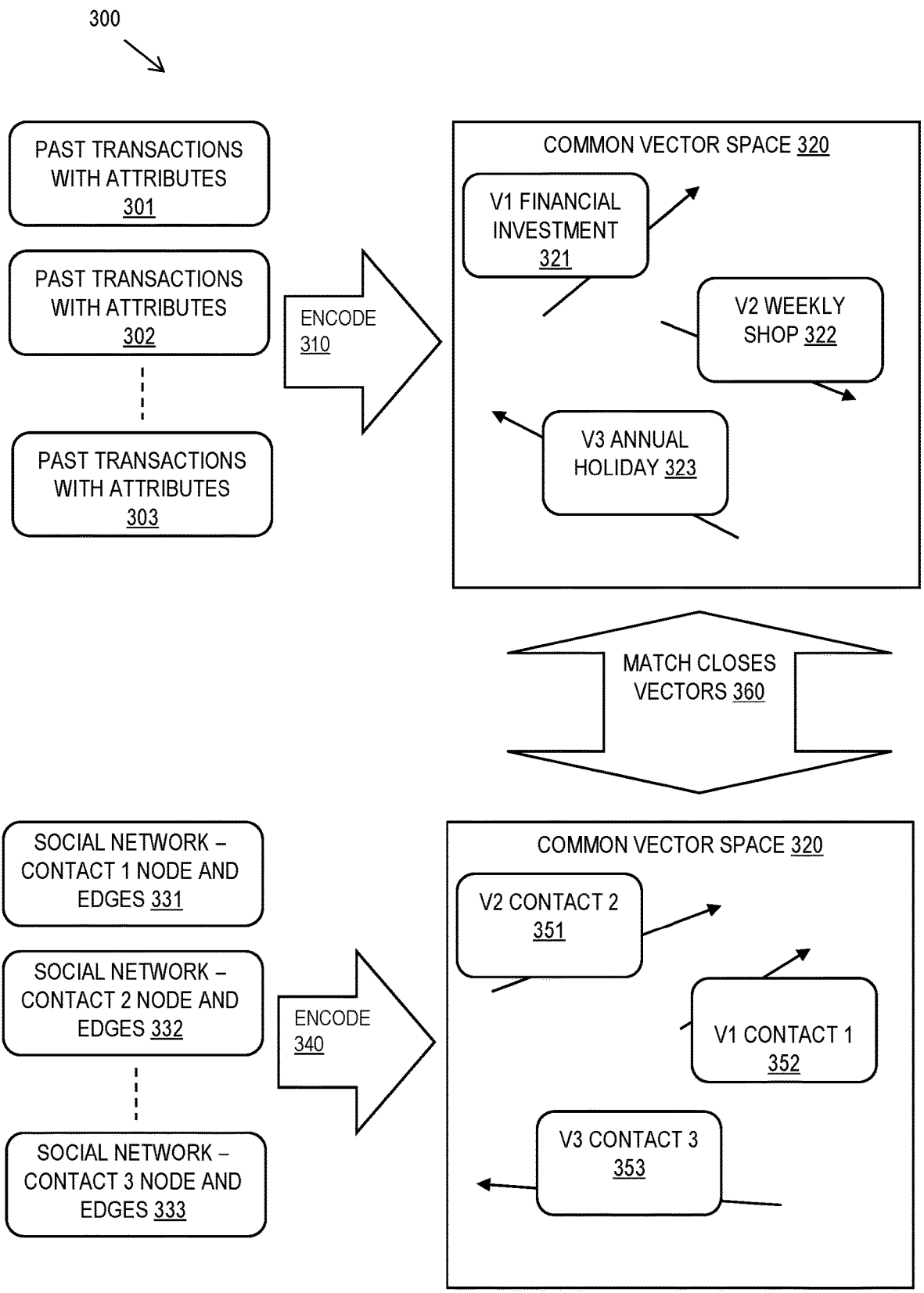
FIGS. 3A and 3B are schematic diagrams of an example embodiment of a method in accordance with embodiments of the present disclosure.

FIG. 3A shows a schematic diagram 300 illustrating an example embodiment of the described method in the preparation phase.

Based on past transactions 301-303 of the transaction verifying entity's population, transactions are encoded 310 into vectors using a learned transaction encoder function (Transaction2Vect) and they are grouped into N categories which are represented by N vectors in a D-dimension vector space 320. Initially, all transaction owners are assigned to having these N vectors as their representative transaction vector set. This set of vectors is referred to as Transaction Template Vector Set S 321-323 (comprised of N vectors with D-dimensions). When the transaction verifying entity has more historical transactions of the transaction owner, each transaction owner will over time be updated with their own personalized set of N-prime categories of transactions based on their personalized set of transaction template vectors S-prime with the same dimension D.

Each vector 321-323 represents a "category" of transaction. Each segment (common demographic features) has the same set of these representative vectors. The representative vectors are dynamically updated but will be assigned to each segment of the population.

Each transaction owner who opts in to use this new service has their Social Networks (SN), which may be represented in a graph database, analyzed. Each of the nodes 331-333 (along with the connection attributes) in the SN is encoded 340 through a learned Social Network encoder function (SN2vect). This is the vector representation 351-353 of each node in the SN into the common D-dimension vector space 320. Each node will have one vector.

The resulting SN vectors are compared 360 to the N vectors in the Transaction Template Vector Set to identify the k closest contact point(s) that should be contacted for each transaction category. This comparison may be carried out using:

Cosine Similarity=Dot(vect1,vect2)/(Euclidean norm (vect1)*Euclidean norm(vect2))

Top k contacts (ranked by the cosine similarity scores) for each of the N categories are then proposed to the transaction owner to approve for use in the transaction execution phase. This step identifies k contact(s) to each of the N vectors in the Transaction Template Vector Set to be further approved by the transaction owner.

The transaction owner in this phase can confirm/modify suggestions and provides consent for the transaction verifying entity to contact the potential contacts.

The method is not limited to one single Social Network (SN). Multiple SNs of each transaction owner can be used as the scope of SN data sources to be encoded via the Social Network vector.

Example of attributes from each connection may include: a longevity of connection; an intensity of relation (how often is information exchanged, commented on each other's posts); degrees of connection (shared connection) or proximity; reason of connection (e.g., common employer, common interests/hobbies).

Once a communication path to the nominated contacts is verified and the nominated contact has confirmed their consent to be later contacted during transaction execution phase, these contacts can later be used during the transaction execution phase as transaction verifier.

At the end of the preparation phase, the result can be represented in a Table for a transaction owner.

Table 1 of Candidate Verifiers for a Transaction Owner

| Transaction Category (N categories) | Candidate verifiers suggested by system and presented to transaction owner | Contact verifiers confirmed/ modified and consented to by transaction owner | Contact verifiers confirmed their consent to be later contacted as 'transaction verifier' |
|---|---|---|---|
| Supermarket (Grocery) | A, B | A, C | A, C |
| Air Ticket (Travel) | B | A | A |
| Sports pass (Leisure) | C, B | C | C |
| Commuting ticket (Work) | D | D | D |
| Investment (Finance) | E | F | F |
| Entertainment (Leisure) | F | C, E | E |

The transaction vector, the SN vectors, Transaction2Vect function, and SN2Vect function may be relearned based on aggregate feedback given by transaction owners indicating who they think should be the approvers of each transaction category. The feedback may be one of the inputs which the SN vector encoder function learns to map from SN nodes to vector space in the future and one of the inputs which the transaction vector encoding function learns to map from transactions to the same vector space in the future. The learning may be personalized to a transaction owner or to segments of transaction owners, when more information of specific transaction owners or segments is available.

Transaction Execution Phase

A payment transaction may be initiated and the transaction may enter the transaction verifying entity network over any channel. During initial fraud screening of the payment transaction, the transaction may be determined as being in the grey zone of "cannot be decided/may be fraudulent". This may include false positives by the existing fraud detection system.

Figure 3B:
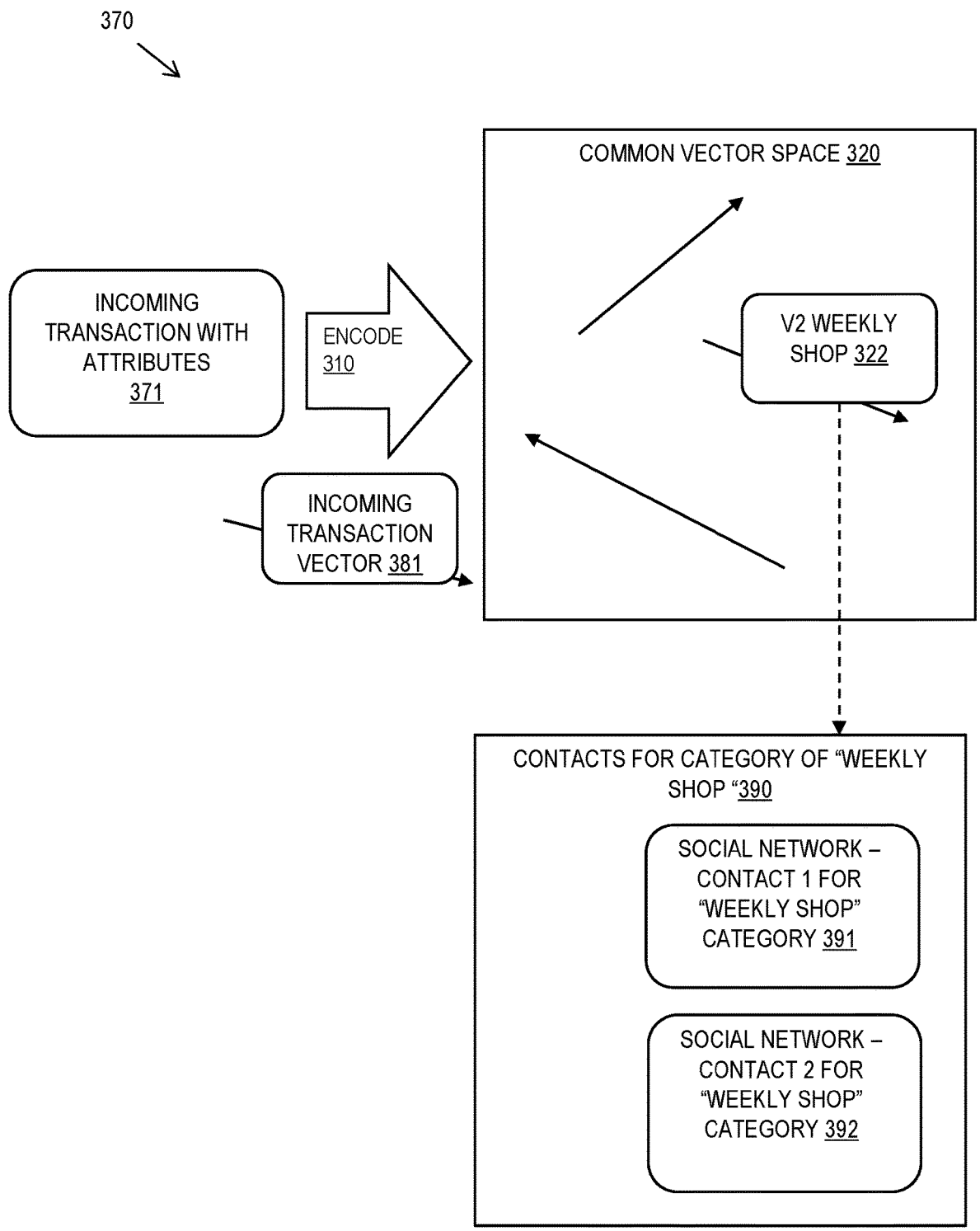

FIG. 3B shows a schematic diagram 370 illustrating an example embodiment of the described method in the transaction phase.

The attributes of the incoming transaction 371, (e.g. merchant, time, amount, . . . ) are used to encode 310 the transaction into a vector 381 in the common D-dimension vector space 320 using transaction vector encoding function.

The objective of determining this Transaction Vector=Trans2Vect(current transaction attributes) is to find the closest vector V in the Transaction Template Vector Set (S) 321-323 using Cosine Similarity. In the illustrated example, the incoming transaction vector 381 is closest to the V2 weekly shop vector 322 in the Transaction Template Vector Set (S).

The associated approved contact(s) 390 for the category of "weekly shop" may be contacted to provide input whether the transactions is low risk or not. The approved contacts 390 may be contacted in an order with a closest contact 391 being contacted followed by a fallback contact 392. This information may be used by the transaction verifying entity in considering approval of the transaction.

Note that only transactions which fall into the grey zone by the current fraud detection may use this process; otherwise, existing processes may be used.

The transaction vector encoder function and the Vector Set S may be relearned based on feedback from the transaction owner if the transactions are not categorized correctly. The model may adjust over time based on the feedback from the live population.

A personalized or segment-based transaction template vector set S, the social network vector encoder function, and the transaction vector encoder function are learned together though a supervised learning scheme. Training data sets are created from a training population who consent to the transaction verifying entity to analyze their historic transactions and social networks.

Transactions are classified into a number of N categories (a hyper-parameter) through a curation process (each transaction is tagged as about hobby, food, holidays, etc.) A bootstrap rule-based identification of social network nodes to be associated as approver candidates are identified for each of the transaction categories (e.g., friends in social network should be linked to hobby; family members (and friends to a lesser affinity level) may be linked to holidays). Friends in social network who have taken photos of going on holidays with the transaction owner may have a strong affinity with holiday transaction.

Using 'training data' obtained from the previous step, the system is trained to learn the transaction template vector set S, the social network vector encoder function, and the transaction vector encoder function.

The size of the dimension D is also a hyper-parameter. Higher value corresponds to more information which can be encoded into the vectors; however, this should not be too high above the amount of information available from transactions and social networks, as otherwise, this will lead to sparse vectors or vectors whose many dimensions do not represent real information.

The method may be used to augment and enhance fraud detection systems, for example, safer payment transactions.

The transactions may be payment transactions or may be other forms of transaction, such as login transactions, identify verification transactions, etc. For example, a login system for a club or an association's account (e.g. a team's account) may require simultaneous multiple authorization or confirmation of login to an online system by more than one person. This described method may be used to identify the most appropriate secondary or tertiary person to confirm the first login.

Figure 4:
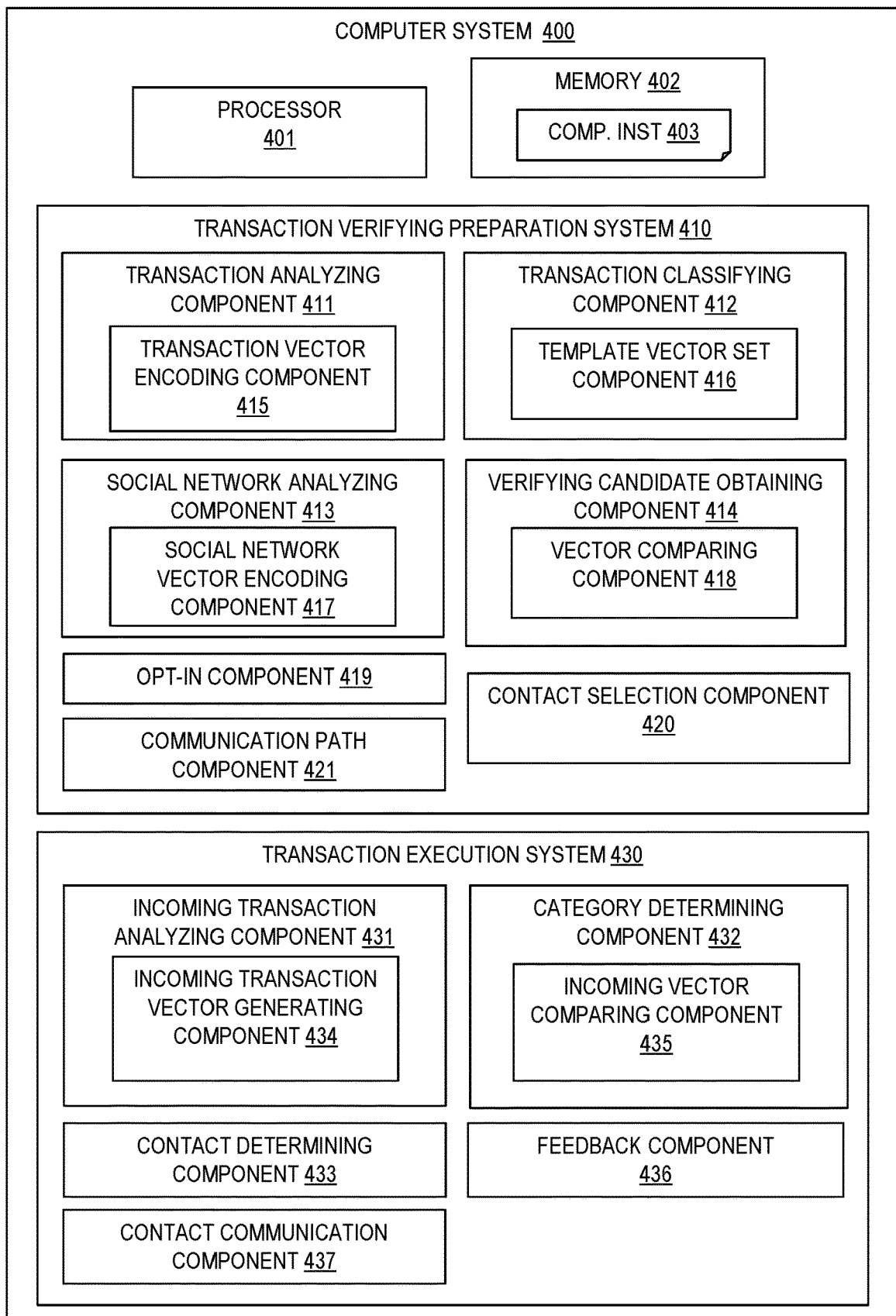
FIG. 4 is a block diagram of an example embodiment of a system in accordance with embodiments of the present disclosure.

Referring to FIG. 4, a block diagram shows an example embodiment of the described system for verifying transaction in a computing system 400 including at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components.

The system for verifying transactions includes a transaction verifying preparation system 410 for carrying out supervised learning for transaction verification and a transaction execution system 430 for verifying an incoming transaction. The transaction verifying preparation system 410 and the transaction execution system 430 may be provided at different computing systems 400 and may be local or remote to a transaction verifying entity system.

The transaction verifying preparation system 410 includes a transaction analyzing component 411 for analyzing past transactions and a transaction classifying component 412 for categorizing the transactions into multiple categories. The transaction verifying preparation system 410 also includes a social network analyzing component 413 for analyzing a social network of a transaction owner to identify a set of closest social network contacts for the transaction owner for each transaction category. The transaction verifying preparation system 410 further includes a verifier candidate obtaining component 414 for proposing the set of closest social network contacts as candidate transaction verifier contacts to be used by a transaction verifying entity for incoming transactions of the transaction category by the transaction owner to the transaction verifying entity.

The transaction verifying preparation system 410 may include an opt-in component 419 for a transaction owner to opt into the verification system. The transaction verifying preparation system 410 may include a contact selection component 420 for proposing the candidate transaction verifiers to the transaction owner to approve for use in a transaction execution phase and receiving consent and/or feedback from the transaction owner to the use of candidate transaction verifiers. The transaction verifying preparation system 410 may include a communication path component 421 for verifying a communication path to the network contacts and obtaining their consent for use during a transaction execution phase.

The transaction analyzing component 411 may include a transaction vector encoding component 415 for encoding past transactions having transaction attributes as transaction vectors in a multiple dimension space. The transaction classifying component 412 may include a template vector set component 416 for classifying the transaction vectors into multiple categories to produce a set of transaction template vectors. The social network analyzing component 413 may include a social network vector encoding component 417 for encoding social network vectors for nodes of the social network using connection attributes in a multiple dimension vector space. The social network vector encoding component 417 may relearn social network vectors based on feedback given by transaction owners indicating who they consider should be transaction verifiers of each transaction category.

The verifying candidate component 414 may include a vector comparing component 418 for comparing the social network vectors to the transaction vectors to identify a closest set of social network contacts for a transaction category. The vector comparing component 418 may use a maximum cosine similarity score in a common vector space.

The transaction vector encoding component 415 and the social network vector encoding component 417 use supervised learning to train a transaction vector encoder function and a social media vector encoder function.

The transaction execution system 430 includes an incoming transaction analyzing component 431 for analyzing an incoming transaction by the transaction owner and a category determining component 432 for determining a transaction category for the incoming transaction. The transaction execution system 430 includes a contact determining component 433 for determining the set of closest social network contacts of the transaction owner for the transaction category. The transaction execution system 430 may include a contact communication component 437 for communicating with a close social network contact to verify the incoming transaction.

The transaction execution system 430 may include a feedback component 436 for providing feedback to the transaction verifying preparation system 410 for further transaction analysis and update of the transaction classifying component 412.

The incoming transaction analyzing component 431 may include an incoming transaction vector generating component 434 and the category determining component 432 may include an incoming vector comparing component 435 for comparing a vector of an incoming transaction by the transaction owner to the set of transaction template vectors to determine a transaction category for the incoming transaction.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
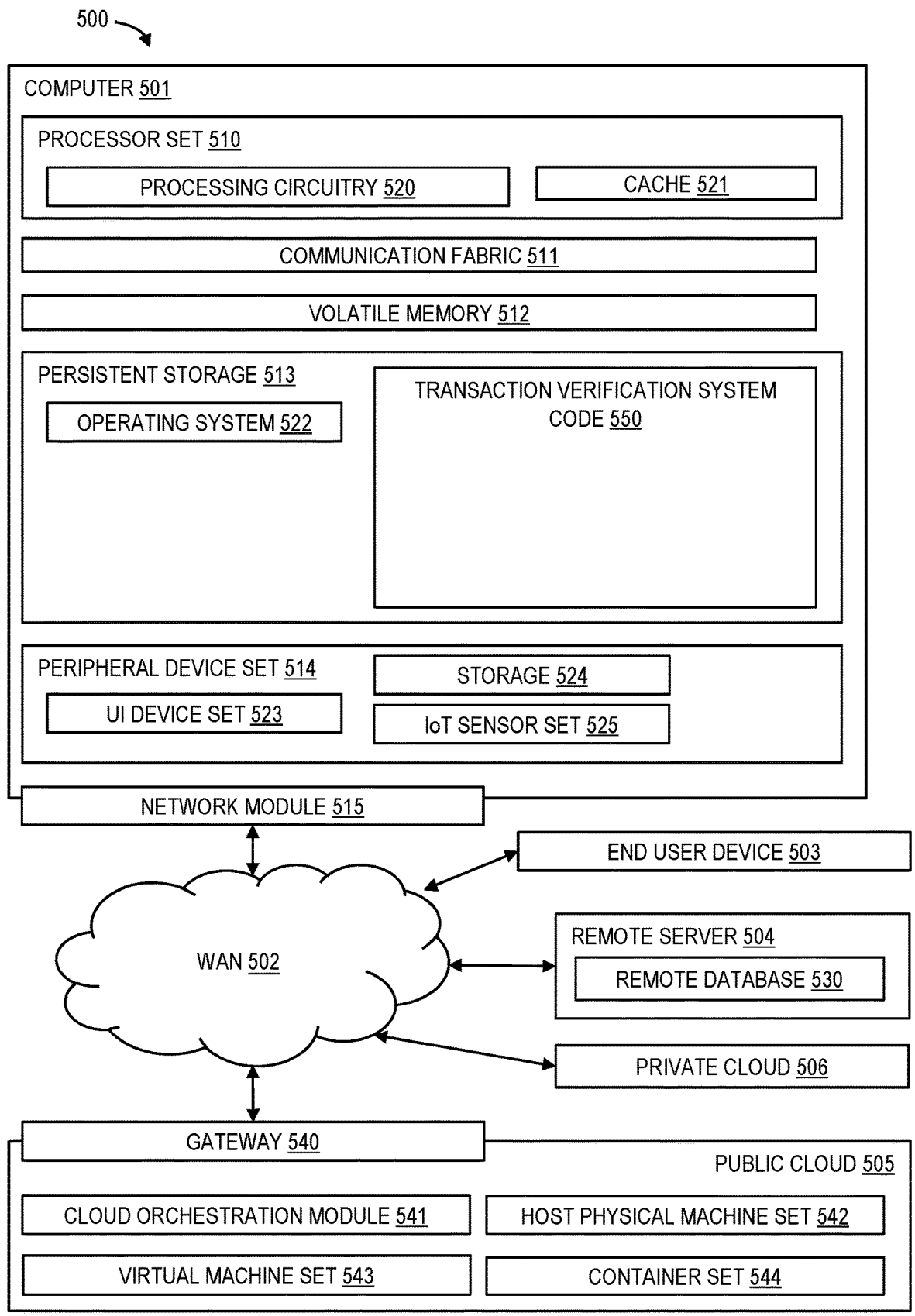
FIG. 5 is a block diagram of an example embodiment of a computing environment for the execution of at least some of the computer code involved in performing the present invention.

Referring to FIG. 5, computing environment 500 contains an example of an environment for the execution of at least some of the computer code involved in performing the inventive methods, such as transaction verification system code 550 for the transaction verifying preparation system 410 and the transaction execution system 430 as described. In addition to block 550, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 550, as identified above), peripheral device set 514 (including user interface (UI) device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 550 in persistent storage 513.

COMMUNICATION FABRIC 511 is the signal conduction path that allows the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, volatile memory 512 is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface-type operating systems that employ a kernel. The code included in block 550 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present disclosure.

What is claimed is:

1. A computer-implemented method for verifying transactions, the method comprising:
   analyzing, by a transaction analyzing component, past transactions and categorizing the transactions into multiple categories;
   analyzing, by a social network analyzing component, a social network of a transaction owner to identify a set of closest social network contacts for the transaction owner for each transaction category; and
   proposing, by a verifying candidate obtaining component, the set of closest social network contacts as candidate transaction verifier contacts to be used by a transaction verifying entity for incoming transactions of the transaction category by the transaction owner to the transaction verifying entity.

2. The method of claim 1, further comprising:
   analyzing, by an incoming transaction analyzing component, an incoming transaction by the transaction owner to determine a transaction category for the incoming transaction; and
   determining, by a contact determining component, the set of closest social network contacts of the transaction owner for the transaction category.

3. The method of claim 2,
   wherein the incoming transaction has previously been determined as being potentially fraudulent by an existing fraud detection system.

4. The method of claim 1, wherein analyzing and categorizing past transactions comprises:
   encoding, by a transaction vector encoding component, past transactions having transaction attributes as transaction vectors in a common multiple dimension space and classifying the transaction vectors into multiple categories to produce a set of transaction template vectors; and
   wherein analyzing a social network of a transaction owner to identify a closest set of social network contacts comprises:
   encoding, by a social network vector encoding component, social network vectors for nodes of the social network using connection attributes in the common multiple dimension vector space; and
   comparing, by a vector comparing component, the social network vectors to the transaction vectors in the common multiple dimension vector space to identify a closest set of social network contacts for a transaction category.

5. The method of claim 4, further comprising:
   comparing, by an incoming vector comparing component, a vector of an incoming transaction by the transaction owner to the set of transaction template vectors to determine a transaction category for the incoming transaction; and
   determining, by a contact determining component, the set of closest social network contacts of the transaction owner for the transaction category.

6. The method of claim 4, further comprising the transaction vector encoding component and the social network vector encoding component using supervised learning to train a transaction vector encoder function and a social media vector encoder function.

7. The method of claim 4, further comprising updating the transaction template vectors based on transaction owner's transactions.

8. The method of claim 4, wherein comparing vectors uses a maximum cosine similarity score in the common vector space.

9. The method of claim 4, wherein the social network vectors are relearned based on feedback given by transaction owners indicating who they consider should be transaction verifiers of each transaction category; and
   wherein the feedback is one input to learning of the encoding of social network vectors to map from social network nodes to the vector space in the future.

10. The method of claim 6, wherein the learning is personalized to a transaction owner or to segments of transaction owners.

11. The method of claim 1, further comprising:
   proposing, by a contact selection component, the candidate transaction verifiers to the transaction owner to approve for use in a transaction execution phase; and
   receiving, by the contact selection component, consent and/or feedback from the transaction owner to the use of candidate transaction verifiers.

12. The method of claim 1, further comprising:
   verifying, by a communication path component, a communication path to and/or consents of the network contacts for use during a transaction execution phase.

13. A system for verifying transactions, the system comprising:
   one or more processors and one or more memories configured to provide computer program instructions to the one or more processors to execute functions of components of a transaction verifying preparation system comprising:
      a transaction analyzing component for analyzing past transactions and a transaction classifying component for categorizing the transactions into multiple categories;
      a social network analyzing component for analyzing a social network of a transaction owner to identify a set of closest social network contacts for the transaction owner for each transaction category; and
      a verifying candidate obtaining component for proposing the set of closest social network contacts as candidate transaction verifier contacts to be used by a transaction verifying entity for incoming transactions of the transaction category by the transaction owner to the transaction verifying entity.

14. The system of claim 13, further comprising a transaction execution system including:
   an incoming transaction analyzing component for analyzing an incoming transaction by the transaction owner and a category determining component for determining a transaction category for the incoming transaction; and
   a contact determining component for determining the set of closest social network contacts of the transaction owner for the transaction category.

15. The system of claim 13, wherein the transaction analyzing component includes:
   a transaction vector encoding component for encoding past transactions having transaction attributes as transaction vectors in a common multiple dimension space; and
   wherein the transaction classifying component includes a template vector set component for classifying the transaction vectors into multiple categories to produce a set of transaction template vectors.

16. The system of claim 13, wherein the social network analyzing component includes a social network vector encoding component for encoding social network vectors for nodes of the social network using connection attributes in a common multiple dimension vector space.

17. The system of claim 13, wherein the verifying candidate obtaining component includes a vector comparing component for comparing social network vectors to transaction vectors in a common multiple dimension vector space to identify a closest set of social network contacts for a transaction category.

18. The system of claim 14, wherein:
   the incoming transaction analyzing component includes an incoming transaction vector generating component; and
   the category determining component includes an incoming vector comparing component for comparing a vector of an incoming transaction by the transaction owner to a set of transaction template vectors to determine a transaction category for the incoming transaction.

19. The system of claim 14, further comprising a contact communication component for communicating with one of the closest social network contacts of the transaction owner for the transaction category to verify the incoming transaction.

20. A computer program product for verifying transactions, the computer program product comprising one or more computer readable storage media having program instructions embodied therewith, the program instructions executable by one or more processors to cause the one or more processors to perform operations comprising:
   analyzing, by a transaction analyzing component, past transactions and categorizing the transactions into multiple categories;
   analyzing, by a social network analyzing component, a social network of a transaction owner to identify a set of closest social network contacts for the transaction owner for each transaction category; and
   proposing, by a verifying candidate obtaining component, the set of closest social network contacts as candidate transaction verifier contacts to be used by a transaction verifying entity for incoming transactions of the transaction category by the transaction owner to the transaction verifying entity.

* * * * *